US010353765B2

(12) United States Patent
Edrich (10) Patent No.: US 10,353,765 B2
(45) Date of Patent: Jul. 16, 2019

(54) METHOD AND DEVICE TO PERFORM EVENT THRESHOLDING IN A FIRMWARE ENVIRONMENT UTILIZING A SCALABLE SLIDING TIME-WINDOW

(71) Applicant: Insyde Software Corp., Taipei (TW)

(72) Inventor: David Edrich, Austin, TX (US)

(73) Assignee: Insyde Software Corp., Taipei (TW)

( * ) Notice: Subject to any disclaimer, the term of this patent is extended or adjusted under 35 U.S.C. 154(b) by 749 days.

(21) Appl. No.: 13/790,108

(22) Filed: Mar. 8, 2013

(65) Prior Publication Data

US 2014/0258787 A1    Sep. 11, 2014

(51) Int. Cl.
*G06F 11/00* (2006.01)
*G06F 11/07* (2006.01)

(52) U.S. Cl.
CPC ...... *G06F 11/0793* (2013.01); *G06F 11/0706* (2013.01)

(58) Field of Classification Search
CPC ............ G06F 2201/86; G06F 2201/88; G06F 11/076; G06F 2201/81; G06F 11/00; G06F 11/0781; G06F 11/3466
See application file for complete search history.

(56) References Cited

U.S. PATENT DOCUMENTS

| | | | | |
|---|---|---|---|---|
| 6,460,107 B1 * | 10/2002 | Rao | ..................... | G06F 11/3409 710/305 |
| 6,476,854 B1 * | 11/2002 | Emerson | .................. | H04L 43/00 348/143 |
| 7,426,657 B2 * | 9/2008 | Zorek, Sr. | ........... | G06F 11/2025 714/11 |
| 7,721,034 B2 * | 5/2010 | Wang | .................... | G06F 9/4812 710/266 |
| 7,990,847 B1 * | 8/2011 | Leroy | ................. | H04L 43/0817 370/216 |

(Continued)

FOREIGN PATENT DOCUMENTS

| | | | |
|---|---|---|---|
| CN | 102340416 A | * | 2/2012 |
| CN | 102340416 B | * | 3/2014 |
| WO | 2011-120019 A2 | | 9/2011 |

OTHER PUBLICATIONS

International Preliminary Report on Patentability mailed from Int'l, Bureau of WIPO, dated Sep. 8, 2015.

*Primary Examiner* — Loan L. T. Truong
(74) *Attorney, Agent, or Firm* — McCarter & English, LLP; John S. Curran (57) ABSTRACT

A scalable method of determining in a firmware environment if the rate of occurrence of a detectable specified type of system event that occurs to a system component or discrete functional unit, has met a criteria with respect to a pre-selected threshold. When the meeting of the threshold criteria is detected, a previously defined action associated with the threshold criteria for the particular event can be invoked by the firmware. Embodiments may establish a sliding time-window that includes a currently detected type of system event and extends back a set duration in the past. Any occurrences of the specified event taking place earlier than the established time-window may be discarded while occurrences of the events during the specified time-window are added together with the newly detected event and compared to a threshold value to see if the threshold criteria has been met.

15 Claims, 5 Drawing Sheets

(56) References Cited

U.S. PATENT DOCUMENTS

| | | | |
|---|---|---|---|
| 8,156,382 B1 * | 4/2012 | Booth | G06F 11/0727 714/42 |
| 8,209,552 B2 * | 6/2012 | Fukuda | G06F 1/3203 713/300 |
| 8,390,514 B1 * | 3/2013 | Baker | H01Q 3/40 342/368 |
| 8,412,981 B2 * | 4/2013 | Munoz | G06F 11/2028 714/10 |
| 8,533,512 B2 * | 9/2013 | Allen-Ware | G06F 1/3206 713/340 |
| 8,949,862 B2 * | 2/2015 | Morgan | G06F 11/3082 718/101 |
| 9,021,474 B2 * | 4/2015 | Lefurgy | G06F 11/3409 718/1 |
| 9,208,028 B2 * | 12/2015 | Oh | G06F 11/141 |
| 2002/0156601 A1 * | 10/2002 | Tu | G06Q 10/10 702/188 |
| 2002/0156785 A1 * | 10/2002 | Kumar | G06F 11/0709 |
| 2003/0061514 A1 * | 3/2003 | Bardsley | G06F 21/55 726/4 |
| 2003/0079007 A1 * | 4/2003 | Merkin | G06F 11/0745 709/223 |
| 2003/0125908 A1 * | 7/2003 | Wynn | G06F 11/26 702/186 |
| 2004/0034854 A1 * | 2/2004 | Cottrell | G06F 9/4812 718/100 |
| 2004/0073806 A1 | 4/2004 | Zimmer | |
| 2006/0075276 A1 | 4/2006 | Kataria et al. | |
| 2006/0230306 A1 * | 10/2006 | Richards | G06F 11/076 714/6.32 |
| 2007/0088974 A1 * | 4/2007 | Chandwani | G06F 11/0781 714/6.11 |
| 2007/0143827 A1 * | 6/2007 | Nicodemus | G06F 21/6218 726/2 |
| 2008/0024207 A1 * | 1/2008 | Baker | G10L 19/025 327/552 |
| 2008/0147945 A1 * | 6/2008 | Zimmer | G06F 9/4812 710/260 |
| 2008/0163254 A1 * | 7/2008 | Cota-Robles | G06F 9/45558 719/318 |
| 2008/0222449 A1 * | 9/2008 | Ramgarajan | G06F 11/073 714/5.11 |
| 2008/0256235 A1 | 10/2008 | Sim et al. | |
| 2008/0256400 A1 * | 10/2008 | Yang | G06F 11/0745 714/57 |
| 2009/0119668 A1 * | 5/2009 | Foley | G06F 9/542 718/102 |
| 2009/0125716 A1 * | 5/2009 | Wooten | G06F 21/57 713/164 |
| 2009/0249049 A1 * | 10/2009 | Weissman | G06F 9/455 712/238 |
| 2009/0327656 A1 * | 12/2009 | Baum | G06F 1/206 712/43 |
| 2010/0046624 A1 * | 2/2010 | Archibald | H04N 19/176 375/240.16 |
| 2010/0192029 A1 * | 7/2010 | Wang | G06F 11/2284 714/723 |
| 2010/0218019 A1 * | 8/2010 | Eckhard | G06F 1/3203 713/322 |
| 2010/0262743 A1 * | 10/2010 | Zimmer | G06F 9/4812 710/267 |
| 2011/0265285 A1 * | 11/2011 | Morgan | F04D 17/168 15/412 |
| 2011/0283286 A1 * | 11/2011 | Wu | G06F 1/329 718/103 |
| 2012/0036250 A1 * | 2/2012 | Vaswani | G01D 4/004 709/224 |
| 2012/0069980 A1 * | 3/2012 | Wall | H04M 3/10 379/142.04 |
| 2012/0072782 A1 * | 3/2012 | Hughes | H04L 12/6418 714/57 |
| 2012/0166952 A1 * | 6/2012 | Alexandrov | G06Q 10/101 715/730 |
| 2012/0179938 A1 * | 7/2012 | Nijhawan | G06F 1/3206 714/47.2 |
| 2012/0307000 A1 * | 12/2012 | Doepke | G06T 3/0068 348/36 |
| 2013/0006987 A1 * | 1/2013 | Stevenne | G06F 11/079 707/737 |
| 2013/0202025 A1 * | 8/2013 | Baron | H04N 21/2385 375/240.02 |
| 2014/0068302 A1 * | 3/2014 | Falik | G06F 9/4418 713/323 |
| 2014/0075164 A1 * | 3/2014 | Indukuru | G06F 11/3419 712/227 |
| 2014/0096249 A1 * | 4/2014 | Dupont | G06F 21/00 726/23 |
| 2014/0122834 A1 * | 5/2014 | Ganguli | G06F 11/3433 712/30 |
| 2014/0164827 A1 * | 6/2014 | Swanson | G06F 11/2035 714/10 |
| 2014/0188829 A1 * | 7/2014 | Ranganathan | G06F 17/30289 707/705 |
| 2014/0351401 A1 * | 11/2014 | Madani | H04L 41/5025 709/223 |
| 2015/0186322 A1 * | 7/2015 | Yao | G06F 21/00 714/42 |
| 2017/0248633 A1 * | 8/2017 | Montijo | G01R 13/0272 |

* cited by examiner

METHOD AND DEVICE TO PERFORM EVENT THRESHOLDING IN A FIRMWARE ENVIRONMENT UTILIZING A SCALABLE SLIDING TIME-WINDOW

BACKGROUND

Computing devices have various established means of detecting, reporting and frequently correcting particular classes of errors before they can do harm to the computing device or active processes running on the computing device. The corrected errors, by themselves, are ordinarily harmless to the jobs being performed by the computer. However, when the corrected errors increase in frequency they can be used to predict a future error that would be uncorrectable and would force executing computer processes to come to an abrupt and unscheduled halt. The harm from such an unexpected termination of processes can be as simple as having lost the value of all the computer jobs in progress. The errors can also lead to the creation of and propagation of bad results that will lead to even greater levels of harm. In other cases, a high rate of errors can indicate that a part of the computing device is inefficient such that an end-user should be informed of the situation so that replacing or removing the part can be undertaken if desired.

Beyond correcting individual errors as they occur, computing devices may contain built-in features for preventing the potential uncorrectable harmful error, or reducing, if not eliminating, that possibility. The cost of the built-in features is often a loss of functionality, performance or a monetary cost that is justifiable because of the potential harm from the possibility of a fatal error. Such built-in features include but are not limited to built-in deactivation of the faulty component or functional unit, substitution of a component, or reduction of voltage or frequency to the entire system. Another form of prevention is the informing of an end-user, such as by message logging, alert or similar means that such a problem is predicted. Once notified the end user can take external action such as gracefully powering down the computing device and hand replacing critical units. Each such error event type may have a different means of prevention and a different critical frequency or threshold value that may vary in range from events per hour to events per year. The threshold value at which such type of error becomes of concern, in general, will be based on additional factors such as environment and toleration of risk.

Unfortunately however, computing devices generally do not have built-in methods of determining when such critical actions should be taken, nor built-in methods for determining the error rates that are of concern very easily. Further, the computing devices are not able to link a frequency of events to cause a specific remedial action that is built into the hardware. Such actions would require that the computing devices be able to fully determine the problem component, calculate an error rate, and have a means of establishing various thresholds prior to directing critical actions to the specific units. For the majority of error types that can be reported today and because of the various methods of implementing computer components and functional units, these tasks are not easily achieved directly by the computer hardware itself. Further addressing the issue at the operating system (OS) level may result in an unacceptable loss of efficiency and introduces issues related to OS choice, policies and dependencies.

BRIEF SUMMARY

Embodiments of the present invention provide an efficient and scalable method of determining, in a firmware environment, if the rate of occurrence of a detectable specified type of system event that occurs to a system component or discrete functional unit, has met a criteria with respect to a pre-selected threshold. When such a meeting of a threshold criteria is detected, a previously defined action associated with the threshold criteria for the particular event can be invoked by the firmware. More particularly, embodiments of the present invention may establish a sliding time-window that includes a currently detected type of system event and extends back a set duration in the past. Any occurrences of the specified event taking place earlier than the established time-window may be discarded while occurrences of the events during the specified time-window are added together with the newly detected event and compared to a threshold value to see if the threshold criteria has been met. The counting function by which the event occurrences during the sliding time window are tabulated may only be executed with a new detection of the specified type of event.

In one embodiment, a computer-implemented method for detecting via firmware the rate of occurrence of a specified type of system event in a computing device includes detecting a new occurrence of a specified type of system event occurring in the computing device. The method also calculates and stores with a firmware module a total number of occurrences of the specified type of system event within a sliding time window. The sliding time window extends back in time from an initial time a set duration into the past. The total number of occurrences of the specified type of system event includes previously detected occurrences that occurred within the time window and the new occurrence. The firmware further compares the calculated total number of occurrences of the specified type of system event with a pre-defined threshold value and invokes a defined action in the computing device in response to the comparing if the calculated total number of occurrences of the specified type of system event meets a criteria with respect to the threshold value.

In another embodiment, a computing device includes a central processing unit (CPU) and firmware code. Upon detection of an occurrence of a specified type of system event in the computing device, the firmware code calculates and stores a total number of occurrences of the specified type of system event within a sliding time window. The sliding time window extends back in time from an initial time a set duration into the past. The total number of occurrences of the specified type of system event includes previously detected occurrences that occurred within the time window and the new occurrence. The firmware also compares the calculated total number of occurrences of the specified type of system event with a pre-defined threshold value and invokes with firmware a defined action in response to the comparing if the calculated total number of occurrences of the specified type of system event meets a criteria with respect to the threshold value.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Embodiments of the present invention provide a fast and flexible method of determining, in a firmware environment, if the rate of occurrence of a specified type of system event that occurs to a system component or discrete functional unit has met a pre-defined criteria with respect to a threshold value. When the criteria has been met, a pre-defined action related to the type of system event may be invoked. A scalable sliding time window is used to keep track of the frequency of the event occurrences. By dividing the sliding time-window into time slices that can be chosen to be smaller or larger depending on the accuracy and range of time tracking necessitated or desired with respect to the particular type of system event, the age of events, in discrete groups, may be tracked. The time window is thus flexibly scalable. Further, because the embodiments of the present invention run in a firmware environment, the monitoring and responding to the system events is part of the computing device/system itself and independent of the installation of any operating system or third party software (and the various dependencies and policies that are intrinsic to such an OS environment). Additionally, through the use of a system management interrupt to trigger the firmware calculations, embodiments of the present invention may provide immediate response to possibly critical situations with a much lower dependency on other parts of a system (software stacks hard drives etc.) and therefore ultimately render a more fault-tolerant and robust computing device/system.

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security reasons.

A computing device may contain one or more elements known as Central Processing Units (CPUs). These CPUs may have a normal operating mode and a second operating mode called System Management Mode (SMM). When the CPU is in normal operating mode it can access all elements of the computer except certain memory regions exclusively dedicated to SMM. In contrast, when the CPU is operating in SMM it is able to access all elements of the computing device including the memory locations allocated for SMM. The CPU may be directed to transition from normal operating mode to SMM by a number of triggers called System Management Interrupt (SMI) events. The exact triggers available differ somewhat from among system designs but the result of an SMI being triggered is that execution in main memory is immediately suspended and execution begins at a specific location in SMM memory. The computing device may be configured such that some firmware is accessible and executable only when the computing device is in SMM mode.

Embodiments of the present invention track errors, associate them with components, and efficiently and quickly calculate an event rate (in the range of events per hour to events per year) for an error or other type of system event. These actions are performed in a firmware environment and are independent of the installation and policies of any particular operating system or operating system feature and are not reliant on third party drivers. With this approach, the embodiments of the present invention enable a threshold value to be set and connect event occurrences which meet a criteria with respect to that threshold value to the triggering of the performance of specified actions. Because these actions occur in a firmware environment, the actions may include component level features that are not always evocable from an operating system environment. Embodiments also allow for the development of machine specific differentiation by hardware manufacturers in an important area of system technology, reliability.

As a result of their implementation in a firmware environment, the embodiments of the present invention provide an approach to monitoring system events that is independent of OS choices, OS policies and OS dependencies (or any software that depends on these) and any problems therein. Manufacturers and resellers can therefore have more direct information on the state of a component (CPUs, memory etc.) which they typically warrantee. The tracking of event occurrences with firmware is more reliable than an OS-based approach since it is not implemented though an OS stack that typically relies on a variety of software interfaces and memory in non-fixed places and other components such as hard drives to record data. The configurable nature of the approach utilized by embodiments of the present invention to event monitoring set forth herein may provide increased accuracy when determining the rate of occurrence of the events. The amount of accuracy is a tradeoff with the amount of memory selected to be used. Further, the streamlined approach described herein limits the amount of SMM processing being performed and therefore speeds error handling.

Figure 1:
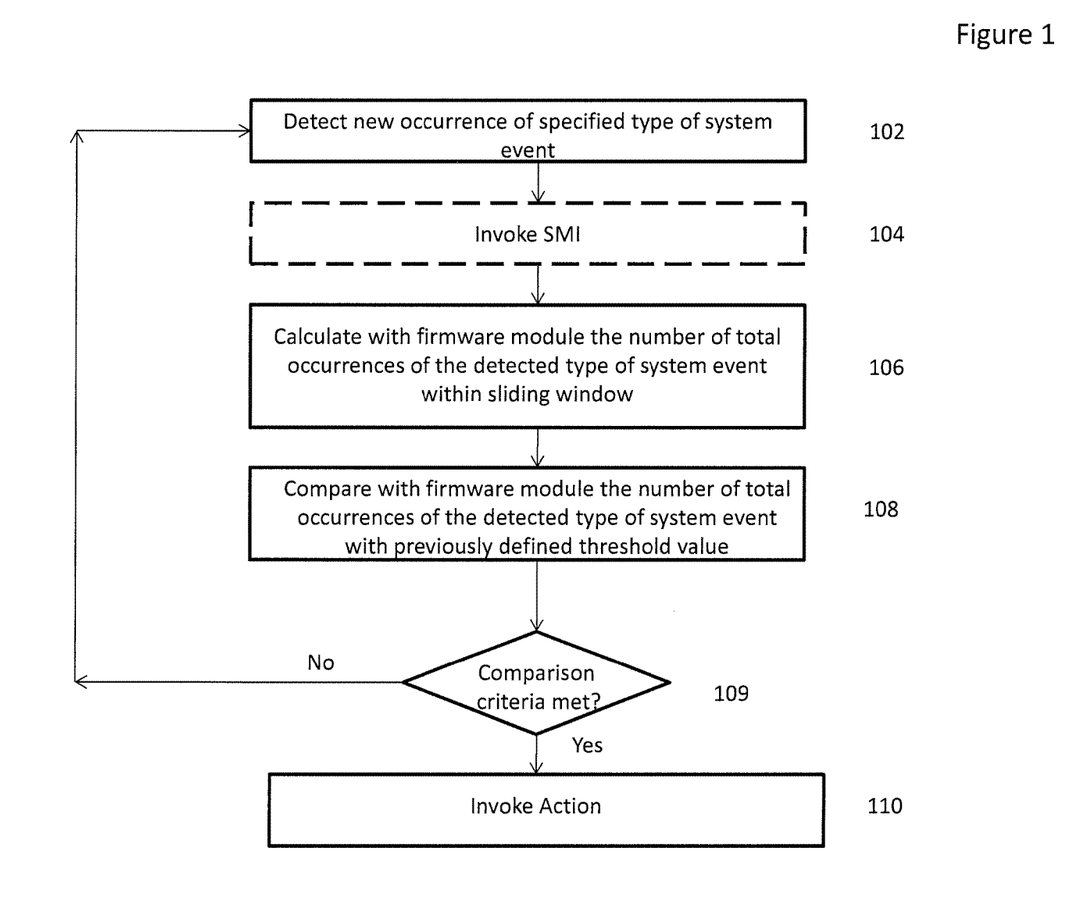
FIG. 1 depicts an exemplary sequence of steps executed by an embodiment of the present invention to provide a firmware-based monitoring of occurrences of a specified system event.

FIG. 1 depicts an exemplary sequence of steps executed by an embodiment of the present invention to provide a firmware-based monitoring of occurrences of a specified system event. The sequence begins with the detection of a new occurrence of a previously specified type of system event (step 102). The detection may be by a built-in diagnostic function of a product itself, such as are typically internally incorporated, when a complex product, such as a CPU, is comprised of linking many functional units (compute unit, cache, IO functions etc). One well known type of error detection is a parity check performed for the transmission of a number. More complex types of built-in diagnostics can be made such as checksums and checksum evaluations. The detected system event may be an error event such as an error in a hardware component. For example, the error may be a bit failure in memory such as DRAM memory or a DIMM or the error may be a cache error. Alternatively the error may be a communication error indicative of a problem with communication between or by computing device components. It should be appreciated that the embodiments of the present invention are not limited to tracking system events that are error events but rather may include other definable events that are detectable. For example, the system event may be indicative of a normal processing operation performed by a particular computing device component, the frequency of which is desirable to track. The detection of the specified system event may also be made by a firmware module operating in normal memory mode (non-SMM) that invokes an SMI.

Following the initial detection of a specified system event, an SMI may be triggered to transfer control to a firmware module of the present invention operative in SMM (step 104). In an alternative embodiment of the present invention, the firmware module may be operative in normal memory mode (non-SMM). The firmware calculation module calculates the number of total occurrences of the detected type of system event that have occurred within a defined time period of the detected event with the aid of a sliding time window (step 106). The sliding time window is explained further below. The calculated total number of occurrences is then compared by a firmware comparison module to a previously established threshold value associated with the specified system event (step 108). If the comparison criteria with respect to the threshold value for the specified system event has been met (step 109), a previously defined action may then be invoked by the firmware (step 110). The comparison criteria with respect to the threshold value may be considered met if the calculated total number of occurrences equals the threshold value, exceeds the threshold value, is within a specified number or percentage of the threshold value or otherwise satisfied some other defined criteria with respect to the threshold value. The actions invoked in the event the threshold criteria is met may include, but are not limited to, deactivation of the component or functional unit, substitution of a component, reduction of voltage or frequency to the component or entire system, and informing of an end-user, by message logging, alert or similar measure.

As noted above, the embodiments of the present invention utilize a sliding time window to track the frequency of occurrences of specified types of system events. Each window is of a set duration of time during which events are counted. Events that occur outside of the window are ignored during calculations. The particular time window duration will depend upon the type of event being tracked as some events occur much more frequently than others with the result that the frequent events require a window covering less time while the less frequent events require a window of longer duration. The calculation of a "current" time window by the embodiments of the present invention during which the number of occurred events are added together and compared to a threshold value requires the advancement of the window (forward in time) upon a specified system event being detected. The current time window extends backwards in time for the set duration of the window. The sliding time window is further partitioned into equal divisions referred to herein as "time slices". The time slices are used to calculate the total number of occurrences in the window by the embodiments of the present invention. This use of time slices provides scalability such that the number of total time slices may be selected as a parameter by a device/equipment manufacturer based on the event type being tracked. The embodiments of the present invention may track the age of the slices in the sliding time window from most recent to oldest by numbering the time slices. For example, in a window with "n" time slices, the most recent window (in which the detected event occurs) may be "0" while the oldest may be numbered as n−1 (i.e.: in a window with 4 time slices the slices may be numbered 0, 1, 2, 3 with 0 being the most recent time slice and 3 being the oldest).

The embodiments of the present invention may calibrate time to true seconds in order to have a time measurement range appropriate to the thresholding range desired. This calibration can be achieved as long as there is an accurate timer device in the system that is accessible. For example, for x86 systems an Advance Configuration and Power Interface (ACPI) timer may be utilized. The ACPI timer is a standard timer that has a defined rate of 3,579,545 ticks per second. Since this timer may be as small as 32-bits, which means it rolls over after 4,294,967,295 ticks, the range of tracking time, with it alone, is only 20 minutes. Accordingly, to extend the range in x86 systems, embodiments may also use the x86 standard RDTSC 64-bit timer, and calibrate it to units of seconds by using the ACPI timer only as a calibration tool. The RDTSC frequency depends on the frequency of the CPU core. For 2 GHz, which is a typical speed, this is by definition 2,000,000,000 ticks per second which yields an effective tracking range of 292 years because the timer supports 64 bits. Increased speeds such as 3 Ghz (and possibly 4 Ghz in the near future) are also possible but regardless the time measurement range is more than 100 years. For non x86 systems, such as ARM, a different timer device may be used. It will be appreciated that the embodiments of the present invention are not limited to being dependent on x86 systems nor the ACPI or RDTSC timers.

Each time slice in a window contains a defined number of ticks per slice. The time stamps of individual ticks are utilized to move the sliding time window. For example, for each type of event, and for each component or functional unit that an event is isolated to, a data structure related to a corresponding sliding window may be maintained by the firmware that includes:

1) First Tick/ZeroTimeSliceTick: the time stamp for the beginning of the first time slice (in ticks).
2) The Time Slice Ages: (by definition the age of the first slice is 0, the slice chronologically earlier is age 1, before that is 2, etc.); and
3) The number of events detected that occurred in each time slice.

Figure 2:
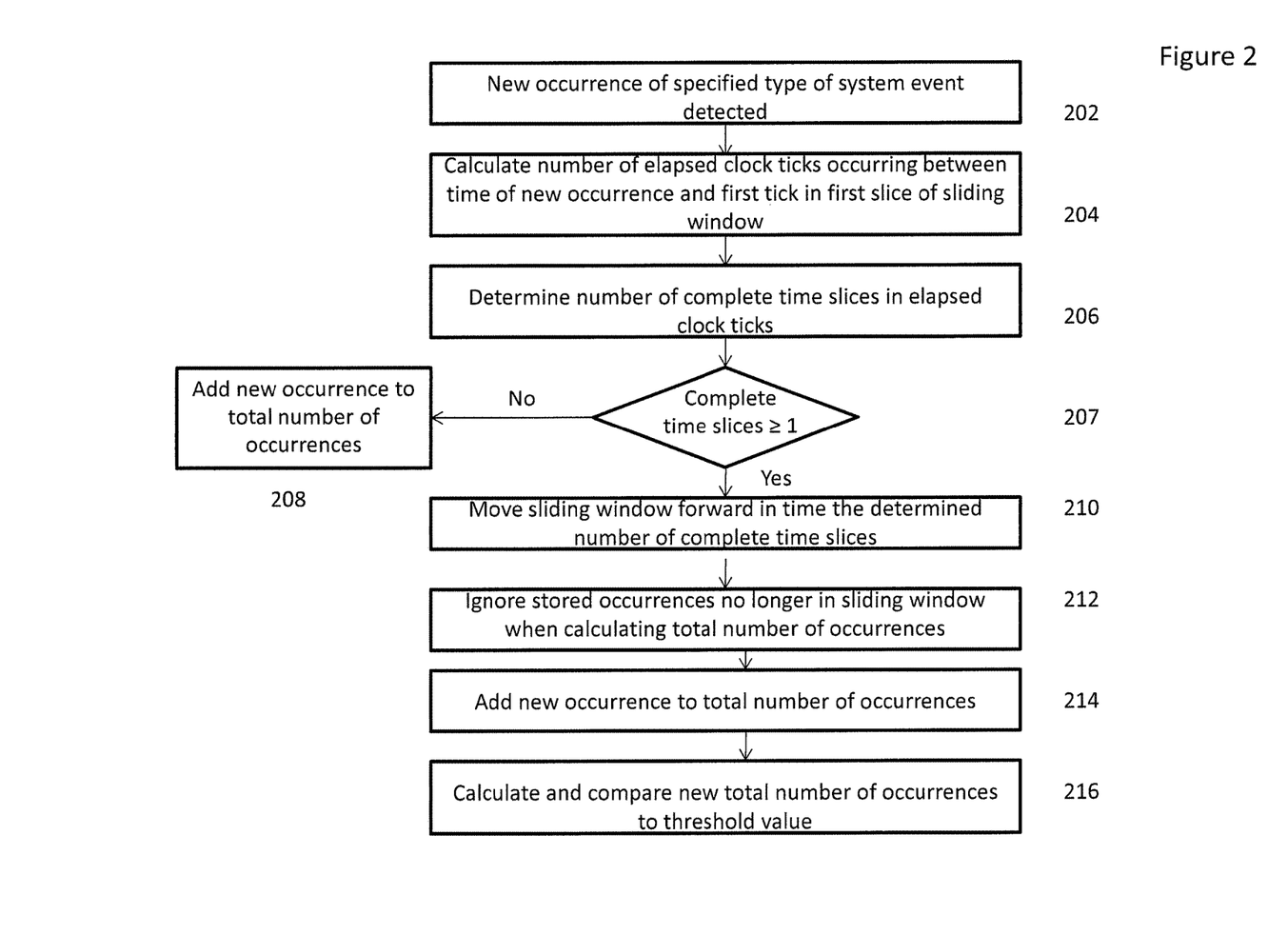
FIG. 2 depicts an exemplary sequence of steps executed by an embodiment of the present invention to utilize a sliding time window while monitoring and responding to occurrences of a specified type of system event.
Figure 3:
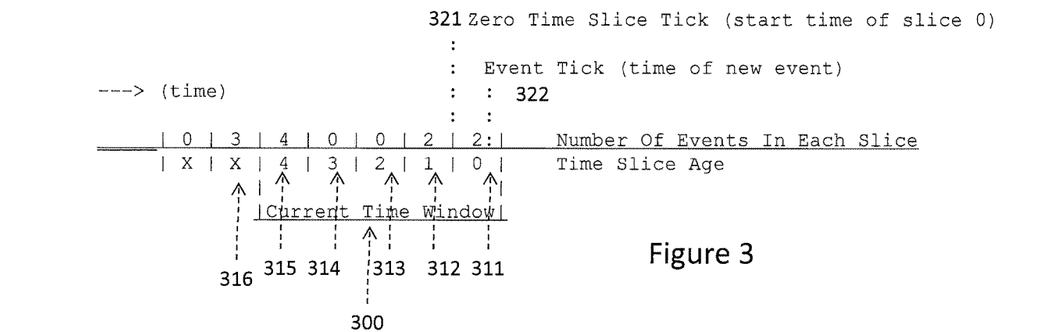
FIG. 3 depicts an exemplary sliding time window of the present invention.
Figure 4:
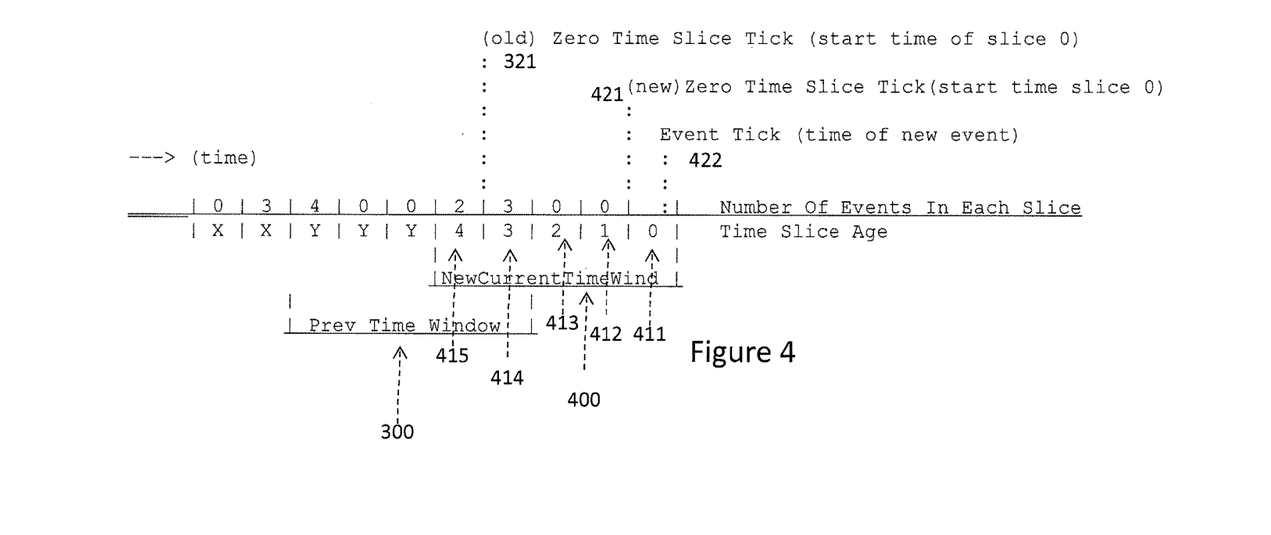
FIG. 4 depicts the exemplary sliding time window of FIG. 3 shifted forward in time.

FIG. 2 depicts an exemplary sequence of steps executed by an embodiment of the present invention to utilize a sliding time window while monitoring and responding to occurrences of a specified type of system event while FIGS. 3 and 4 provide a visual depiction of the operation of a sliding time window.

With respect to FIG. 2, the exemplary sequence begins with the detection of a new occurrence of a previously specified type of system event (step 202). The event time (tick timestamp) is read and the number of elapsed clock ticks between the detected event and the first tick in the first (zero) time slice of the sliding time window is calculated (step 204). From the elapsed ticks the number of complete time slices, if any, that have elapsed since the previous event is determined so that it can be determined whether or not the sliding time window needs to be moved prior to updating the number of total occurrences in the window (step 206). If the determined number of complete time slices that have elapsed is less than 1, the window is not moved prior to calculation (since the event has occurred in the current time slice) and the new event occurrence is merely added to the current time slice and the total number of occurrences for the slice and the window is calculated by summing the number of events for each time slice in the window (step 208).

However, if an amount of time equal to at least one complete time slice has elapsed since the last event, the window is shifted forward in time the number of determined complete time slices prior to the calculation of total occurrences being performed. The sliding time window is moved by increasing the zero time slice tick (first tick of the first slice in the window) by the number of ticks per slice times the number of determined complete slices (step 210). As an example, and only for explanatory purposes, if there were 1000 ticks per slice and it was determined that between 2000-2999 ticks had elapsed since the last event (first tick), the first tick/zero time slice tick would be adjusted by adding two time slices or 2000 ticks. It will be appreciated that the number of ticks in a slice will likely be different from the number 1000 for most applications of the present invention (if the time since the last event is greater than the entire window the first tick is set to be equal to the event tick and all event totals are zeroed). The new event is added to the data for the new first (zero) time slice in the window and any events that occurred in the oldest slices of the previous window that are no longer in the new window are discarded. For example, the firmware may add the determined number of complete time slices to each time slice age number. Any time slice number that has an age number greater than n−1 (the total number of time slices in the sliding time window minus one), is no longer part of the window and is discarded for the calculation of the number of total occurrences. The number of events in the out of window slice(s) may be zeroed or otherwise ignored by the firmware calculation module and the corresponding memory locations used to track data for those slices may be made available for reuse following the window's movement. The total number of events in each slice of the current window are then added to arrive at a total number of occurrences. This new number may be then compared to the threshold value to see if the comparison criteria has been met (step 216). In another embodiment, rather than performing a new calculation for the total number of occurrences in each new window, a previous total number of occurrences that has been stored may be adjusted by adding the new occurrence and subtracting any occurrences that have "aged" out of the window following the window's movement.

This concept of a sliding window is further explained with respect to FIGS. 3 and 4. FIG. 3 depicts the situation where a system event is detected within the first slice of a current time window 300. The current time window 300 is composed of five time slices with age numbers 0-4 (311-315). For each time slice 311-315, the number of event occurrences that occurred within the time slice is saved in a corresponding data structure. As depicted, there were four occurrences of the event being tracked occurring in time slice 4 (315), no occurrences in time slices 3 (314) and 2 (313) and two occurrences each in slice 1 (312) and 0 (311) for a total of eight previous occurrences of the type of system event being monitored. The three occurrences occurring in the time slice 316 immediately outside the window are ignored as being too old to be included in the current calculation. What is considered "too old" will depend upon the specifics of the event being monitored and is considered in setting up the window parameters by the device/equipment manufacturers or other authorized user tasked with configuring the firmware. The first "0" slice 311 includes a zero time slice tick 321 marking the first tick of the first slice. The time stamp of the detected event shown as "EventTick" 322 in FIG. 3 occurs within the first "0" slice 311 so a calculation of the elapsed ticks divided by the number of ticks per slice will yield a result less than one. Therefore the sliding window need not be moved prior to calculating the total number of occurrences in the window. The new total number of occurrences will therefore be nine and if that total meets the comparison criteria with respect to the threshold value for the event, a pre-defined action will be invoked by the firmware. In some circumstances the firmware will carry out the action and in others the firmware will merely trigger some other process that will perform the pre-defined action.

FIG. 4 depicts a situation where a system event is detected that is not within the first slice of the previous time window 300. The new event tick 422 in this case takes place more than three but less than four slices of time later than the old first (zero) time slice tick 321. As a result, when the elapsed ticks is calculated, the number of complete slices that is determined to have elapsed is three and the previous window "slides" forward in time the number of ticks that make up three time slices. In other words, the new first (zero) time slice tick 421 in the new first slice 411 of the new current time window 400 is offset from the old first (zero) time slice tick 321 of the previous window 300 by a number of ticks equal to exactly three time slices. The new current time window 400 is then composed of the five time slices age numbered 0-4 (411-415) with the new event tick 422 occurring within the first "0" slice 411. For each time slice 411-415, the number of event occurrences that occurred within the time slice is saved in a corresponding data structure. Of note, the time slices 3 (414) and 4 (415) which are now the two oldest time slices in the current time window 400 were previously the two most recent time slices 0 (311) and 1 (312) in the previous window 300 before the window moved. Further, because of the window's movement, the event occurrence totals that took place in slices 2-4 (313-315) of the old time window 300 (depicted with the letter Y in FIG. 4) are not included in the calculation of the total occurrences in the new current time window 400 since those slices are no longer part of the current time window following the window's movements. As a result, when the total event occurrences calculation is performed for the new window the new total of occurrences is 6, composed of the two occurrences in slice 4 (415), the three occurrences in slice 3 (414) and the newly detected event occurrence in slice 0 (411).

The embodiments of the present invention may also be extended to multilevel thresholding where a second action may be taken as a result of a first criteria being met with respect to a threshold value. In such a multi-level thresholding, one can perform a second threshold comparison based on the result of a first threshold comparison. For example, the number of occurrences of a type of system event may be tracked to determine the number of times that the threshold comparison criteria is met. A second action may then be invoked if number of times the first criteria has been met exceeds a second criteria for that type of system event. In another embodiment, the meeting of a first criteria with respect to a threshold could also trigger a second level thresholding in which a different type of system event is tracked as a result of the first criteria being met.

Figure 5:
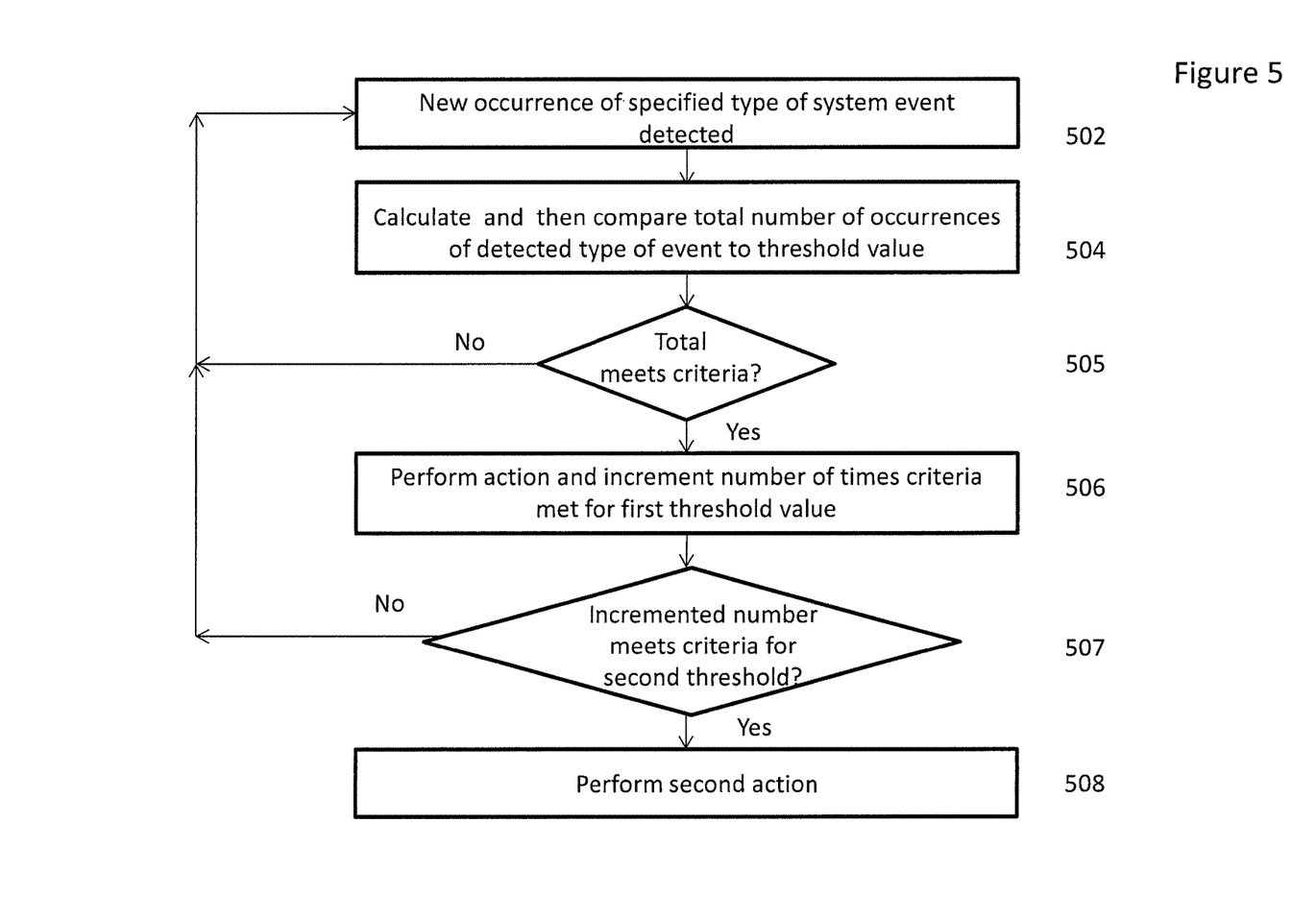
FIG. 5 depicts an exemplary sequence of steps executed by an embodiment of the present invention to perform multi-level thresholding.

FIG. 5 depicts an exemplary sequence of steps executed by an embodiment of the present invention to perform multi-level thresholding. The sequence begins with the detection of a specified type of system event (step 502). The number of total occurrences of the system event within a sliding time window is then calculated and the total compared to threshold value as discussed above (step 504). If the total number of occurrences meets the criteria with respect to the threshold value (i.e. equals/exceeds/is a set percentage of, etc.) (step 505) an action is performed and a total number of times the criteria has been met is incremented (step 506). The total number of times the criteria has been met is compared to a second threshold (step 507) and if the criteria is met with respect to the second threshold, a second pre-defined action is performed (step 512). In such a manner, the device/system may be configured to take incremental actions if the frequency of the event continues or increases.

Although the description herein has described the performance of event monitoring that provides ongoing event monitoring and triggers the firmware-based calculation of the total number of occurrences of the detected event type only with each detected occurrence, other implementations are also possible within the scope of the present invention. For example, periodic polling could be conducted by periodically triggering an SMI to activate the operation of firmware performing the conducting, comparing and actions described herein. In such a case the polling frequency must be large enough compared to the possible rate of the events of interest.

Figure 6:
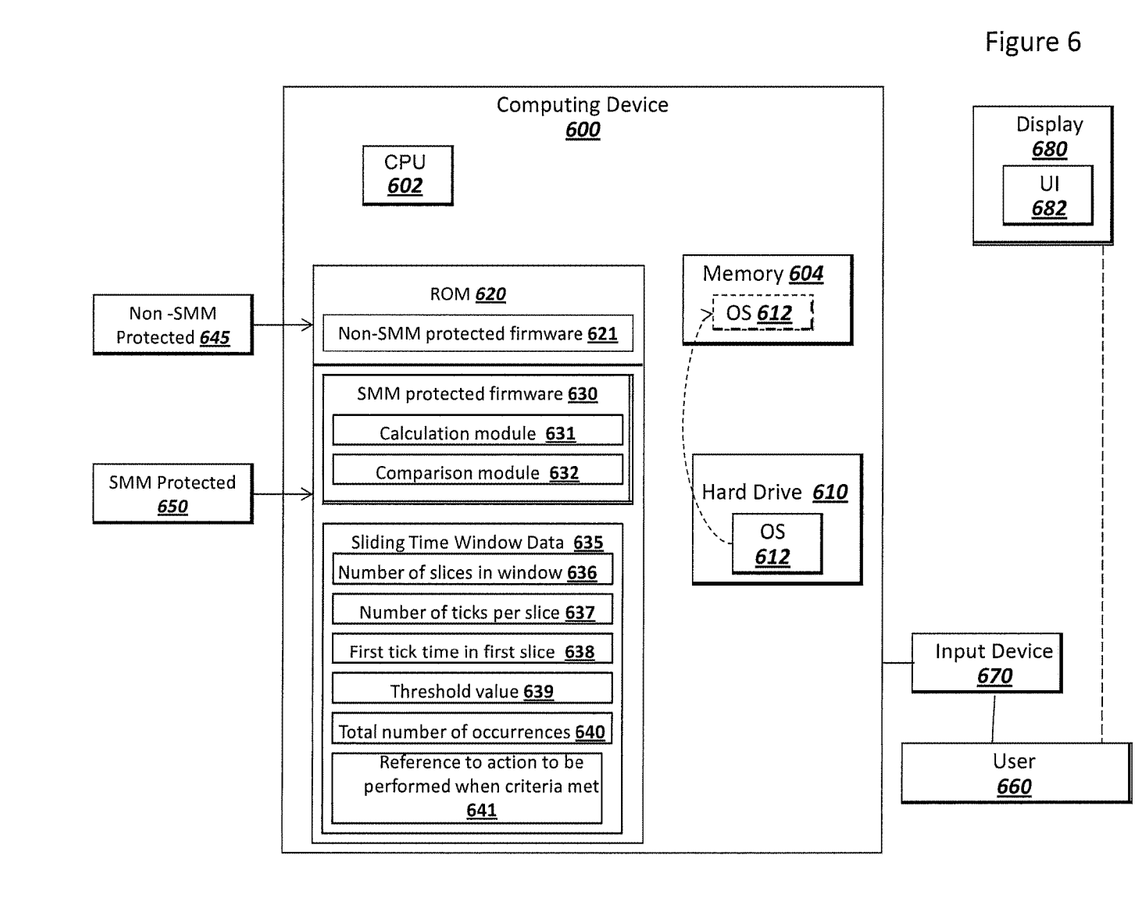
FIG. 6 depicts an exemplary environment suitable for practicing an embodiment of the present invention.

FIG. 6 depicts an exemplary environment suitable for practicing embodiments of the present invention. An exemplary computing device 600 is equipped with a CPU 602, memory 604, such as Random Access Memory (RAM) and non-volatile storage 610 such as a hard drive or other non-volatile storage location. The non-volatile storage 610 may include an operating system (OS) 612 that is loaded into memory 604 during a boot process. The computing device 600 may be a tablet computing device, cell phone, smart phone, PDA, laptop, netbook, desktop computer, mobile computing device or other computing device equipped with a processor. The computing device includes ROM 620. ROM 620 may include an SMM protected portion 650 and non-SMM protected portion 645. Non-SMM protected firmware 621 may be resident in ROM 620 and may be operable to detect new occurrences of specified types of system events. In one embodiment, Non-SMM protected firmware may invoke an SMI in response to the detection of a specified type of system event. SMM protected firmware 630 may include a calculation module 631 and comparison module 632. Calculation module 631 may calculate the total number of occurrences of specified system event during a sliding time window. Comparison module 632 may compare the calculated total number of occurrences to a threshold value based on pre-defined criteria. SMM protected firmware 630 may also be configured to adjust the time location of the sliding time window as described herein and trigger a pre-defined action when criteria is satisfied with respect to a threshold value. It will be appreciated that the functionality of the non-SMM protected firmware 621, SMM protected firmware 630, calculation module 631 and comparison module 632 may be combined into a greater or lesser number of firmware modules without departing from the scope of the present invention. Further, in an embodiment of the present invention some or all of the firmware described herein may be operable in regular memory mode and not require the invocation of SMM. Conversely, in another embodiment, some or all of the firmware described herein may be operable in SMM after invocation of an SMI. Additionally, in an embodiment, a non-firmware process may be used to initially detect the occurrence of the system event before the firmware-based calculation, comparison and action steps described herein are conducted.

ROM 620 may also include sliding time window data 635 that is accessible to Non-SMM protected firmware 621 and/or SMM protected firmware 630. The stored sliding time window data 635 may include the number of slices in a window 636, the number of ticks per slice 637, the timestamp of the first tick in the first slice of a window 638 and a threshold value for a specified type of system event 639. Stored sliding time window data 635 may also include a total number of occurrences of a specified type of system event for each slice in a window 640 and reference to an action to be performed when criteria with respect to a threshold value is met 641. The reference 641 may be a reference to an executable task, process or other executable code. Alternatively, rather than invoking a separate process, the firmware of the present invention may directly perform a pre-defined action.

Computing device 600 may also include an input device 670 accessed by a user 660. The user 660 may view a display surface or device 680 in communication with computing device 600. Display surface or device 680 may display a user interface 682. In one embodiment, an authorized user may use user interface 682 to set parameters in the firmware so as to control the size of the sliding windows and time slices.

The embodiments of the present invention utilize a firmware-based approach that makes error handling intrinsically part of the system and therefore software and OS-independent. With embodiments of the present invention, one can, for example, warrant computer parts to only have a certain error rate or to have other performance characteristics. Further the firmware-based embodiments provide a reliable and secure way of monitoring an event rate and reporting it when the rate meets a criteria related to a threshold value regardless of software (or operating system) choices an end user makes. In general, the utilizing of a scalable sliding time window for counting error events allows device, component and system manufacturers to offer computer systems/devices with better and more accurate error handling and other performance characteristics. Through use of standard computer built-in timers, the time of events may be measured accurately to years. The embodiments of the present invention further provide a scalable approach in that events that occur at extremely slow rates and relatively high rates can be handled by the same method. The event tracking is configurable to achieve greater rate accuracy by offering a tradeoff between accuracy and memory depending on the desired characteristic of the device/system/component. The use of firmware by embodiments also allows critical error handling to be put in the control of the manufacturer while providing independence from operating system and third party software drivers and their complex software stacks, as well as any general one-size fits all error handling policies found in operating system or hardware domains.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computer-implemented method for detecting via firmware the rate of occurrence of a specified type of system event in a computing device, the method comprising:
    detecting a new occurrence of a specified type of system event occurring in the computing device;
    invoking a System Management Interrupt (SMI) in response to the detecting of the new occurrence, a processor in the computing device entering System Management Mode (SMM) in response to the SMI;
    calculating and storing with a firmware module, after the entry of the processor into SMM and while the processor is operating in SMM, a total number of occurrences of the specified type of system event within a sliding time window, the sliding time window extending back in time a set duration into the past, the total number of occurrences including previously detected occurrences that occurred within the time window and the new occurrence,
wherein the sliding time window is equally partitioned into a pre-determined number of time slices and the number of occurrences of the specified type of system event occurring within each time slice is stored, and
wherein a firmware parameter for the pre-determined number of time slices within the sliding time window is configurable;
    comparing with firmware, while the processor is operating in SMM, the calculated total number of occurrences of the specified type of system event with a pre-defined threshold value; and
    invoking with firmware, while the processor is operating in SMM, a defined action in the computing device in response to the comparing if the calculated total number of occurrences of the specified type of system event meets a criteria with respect to the threshold value.

2. The method of claim 1 wherein each time slice is composed of a defined number of clock ticks established with respect to a system clock of the computing device.

3. The method of claim 2 wherein a first sliding time window includes a defined number of time slices including a most recent in time first time slice and extending backwards in time from the first time slice, and further comprising:
    calculating a number of elapsed clock ticks occurring between the time of the new occurrence and a first tick in the first slice of the first sliding time window;
    determining a number of complete time slices in the elapsed clock ticks; and if the number of complete time slices is at least 1:
    moving the first sliding time window forward in time to include the determined number of complete time slices so as to create a new sliding time window with a new first time slice, the moving correspondingly subtracting from the new sliding time window the determined number of time slices furthest away in time from the first time slice of the first sliding time window, the new sliding time window including the same defined number of time slices as the old sliding time window, the occurrences of the specified type of system event that occurred in the subtracted time slices not included in a total number of occurrences for the new sliding window and the new occurrence added to the total number of occurrences for the new sliding window, and
    if the number of complete time slices is less than 1:
    adding the new occurrence to the total number of occurrences while not moving the first sliding time window.

4. The method of claim 1 wherein the type of system event is a hardware error or a processing event performed by the computing device.

5. The method of claim 1 wherein, when the event occurrence meets a criteria with respect to the threshold value, the firmware begins monitoring of a second threshold value with respect to the same or different type of system event and invokes a different action if a criteria with respect to the second threshold value is met.

6. A non-transitory medium holding computer-executable instructions for detecting via firmware the rate of occurrence of a specified type of system event in a computing device, the instructions when executed causing the computing device to:
    detect a new occurrence of a specified type of system event occurring in the computing device;
    invoke a System Management Interrupt (SMI) in response to the detecting of the new occurrence, a processor in the computing device entering System Management Mode (SMM) in response to the SMI;
    calculate and store with a firmware module, after the entry of the processor into SMM and while the processor is operating in SMM, a total number of occurrences of the specified type of system event within a sliding time window, the sliding time window extending back in time a set duration into the past, the total number of occurrences including previously detected occurrences that occurred within the time window and the new occurrence,
wherein the sliding time window is equally partitioned into a pre-determined number of time slices and the number of occurrences of the specified type of system event occurring within each time slice is stored, and
wherein a firmware parameter for the pre-determined number of time slices within the sliding time window is configurable;
    compare with firmware, while the processor is operating in SMM, the calculated total number of occurrences of the specified type of system event with a pre-defined threshold value; and
    invoke with firmware, while the processor is operating in SMM, defined action in response to the comparing if the calculated total number of occurrences of the specified type of system event meets a criteria with respect to the threshold value.

7. The medium of claim 6 wherein each time slice is composed of a defined number of clock ticks established with respect to a system clock of the computing device.

8. The medium of claim 7 wherein a first sliding time window includes a defined number of time slices including a most recent in time first time slice and extending backwards in time from the first time slice, and the instructions when executed further cause the computing device to:

calculate a number of elapsed clock ticks occurring between the time of the new occurrence and a first tick in the first slice of the first sliding time window;

determine a number of complete time slices in the elapsed clock ticks; and if the number of complete time slices is at least 1:

move the first sliding time window forward in time to include the determined number of complete time slices so as to create a new sliding time window with a new first time slice, the moving correspondingly subtracting from the new sliding time window the determined number of time slices furthest away in time from the first time slice of the first sliding time window, the new sliding time window including the same defined number of time slices as the old sliding time window, the occurrences of the specified type of system event that occurred in the subtracted time slices not included in a total number of occurrences for the new sliding window and the new occurrence added to the total number of occurrences for the new sliding window, and if the number of complete time slices is less than 1:

add the new occurrence to the total number of occurrences while not moving the first sliding time window.

9. The medium of claim 6 wherein the type of system event is a hardware error or a processing event performed by the computing device.

10. The medium of claim 6 wherein, when the event occurrence meets a criteria with respect to the threshold value, the firmware begins monitoring of a second threshold value with respect to the same or different type of system event and invokes a different action if a criteria with respect to the second threshold value is met.

11. A computing device, comprising:

a central processing unit (CPU); and firmware code that upon detection of an occurrence of a specified type of system event in the computing device:

invokes a System Management Interrupt (SMI) in response to the detecting of the occurrence, the CPU entering System Management Mode (SMM) in response to the SMI;

calculates and stores, after the entry of the CPU into SMM and while the processor is operating in SMM, a total number of occurrences of the specified type of system event within a sliding time window, the sliding time window extending back in time from an initial time a set duration into the past, the total number of occurrences including previously detected occurrences that occurred within the time window and the new occurrence, wherein the sliding time window is equally partitioned into a pre-determined number of time slices and the number of occurrences of the specified type of system event occurring within each time slice is stored, and wherein a firmware parameter for the pre-determined number of time slices within the sliding time window is configurable;

compares the calculated total number of occurrences of the specified type of system event with a pre-defined threshold value while the processor is operating in SMM; and invokes with firmware, while the processor is operating in SMM, defined action in response to the comparing if the calculated total number of occurrences of the specified type of system event meets a criteria with respect to the threshold value.

12. The computing device of claim 11 wherein each time slice is composed of a defined number of clock ticks established with respect to a system clock of the computing device.

13. The computing device of claim 12, further comprising:

a user interface enabling an authorized user to set at least one of the specified type of system event, the number of time slices in the sliding time window and the number of clock ticks in a time slice.

14. The computing device of claim 12 wherein a first sliding time window includes a defined number of time slices including a most recent in time first time slice and extending backwards in time from the first time slice, and the firmware is further:

calculates a number of elapsed clock ticks occurring between the time of the new occurrence and a first tick in the first slice of the first sliding time window;

determines a number of complete time slices in the elapsed clock ticks; and if the number of complete time slices is at least 1:

moves the first sliding time window forward in time to include the determined number of complete time slices so as to create a new sliding time window with a new first time slice, the moving correspondingly subtracting from the new sliding time window the determined number of time slices furthest away in time from the first time slice of the first sliding time window, the new sliding time window including the same defined number of time slices as the old sliding time window, the occurrences of the specified type of system event that occurred in the subtracted time slices not included in a total number of occurrences for the new sliding window and the new occurrence added to the total number of occurrences for the new sliding window, and if the number of complete time slices is less than 1:

adds the new occurrence to the total number of occurrences while not moving the first sliding time window.

15. The computing device of claim 12 wherein the type of system event is a hardware error or a processing event performed by the computing device.

* * * * *